Figure 6:
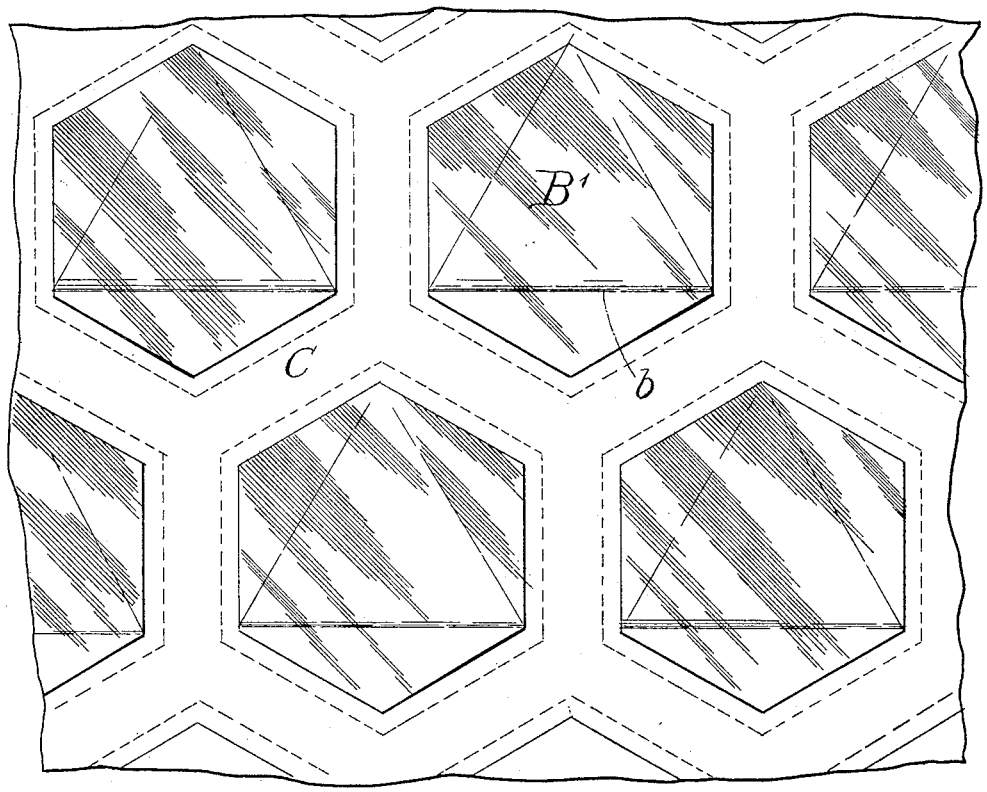

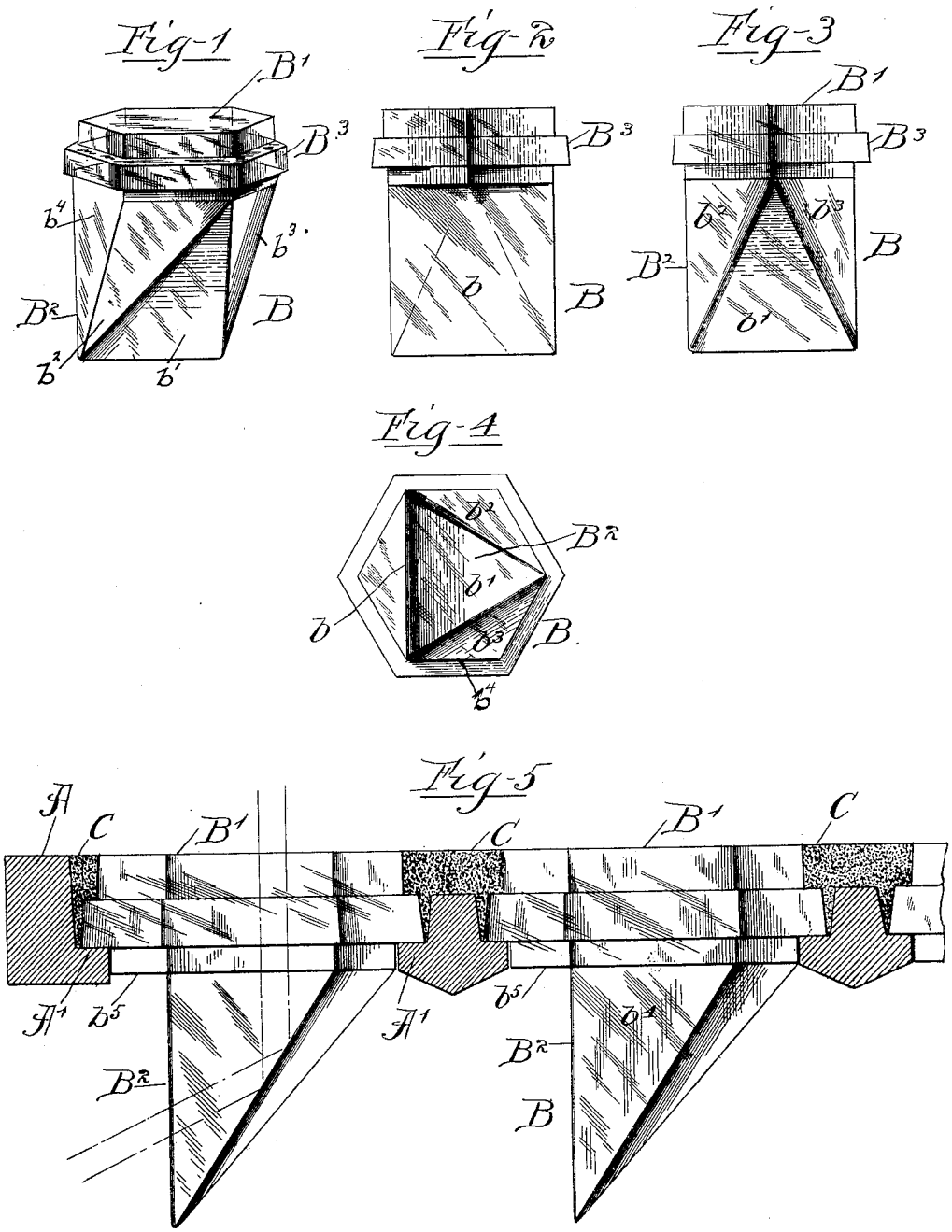

(No Model.) 2 Sheets—Sheet 2.

E. J. SULLIVAN.
ILLUMINATING LENS FOR SIDEWALKS.

No. 603,799. Patented May 10, 1898.

UNITED STATES PATENT OFFICE.

EUGENE J. SULLIVAN, OF RIVER FOREST, ILLINOIS, ASSIGNOR TO THE BROWN BROTHERS MANUFACTURING COMPANY, OF CHICAGO, ILLINOIS.

ILLUMINATING-LENS FOR SIDEWALKS.

SPECIFICATION forming part of Letters Patent No. 603,799, dated May 10, 1898.

Application filed April 5, 1897. Serial No. 630,885. (No model.)

*To all whom it may concern:*

Be it known that I, EUGENE J. SULLIVAN, of River Forest, in the county of Cook and State of Illinois, have invented certain new and useful Improvements in Illuminating-Lenses for Sidewalks; and I do hereby declare that the following is a full, clear, and exact description thereof, reference being had to the accompanying drawings, and to the letters of reference marked thereon, which form a part of this specification.

This invention relates to improvements in illuminating-lenses for use in sidewalks, vaults, skylights, and other like places, which are adapted to be mounted in suitable frames to transmit rays of light to the space inclosed by said frame.

The object of the invention is to provide an improved construction in devices of this character by which the same will have high dispersive power and will be capable of distributing the transmitted rays of light uniformly in all parts of the space to be illuminated.

The invention consists in the matters hereinafter set forth, and more particularly pointed out in the appended claims.

In the drawings illustrating my invention in one form, Figure 1 is a perspective view of a tile or lens embodying my invention. Fig. 2 is a front elevation of the same. Fig. 3 is a rear elevation thereof. Fig. 4 is a bottom plan view thereof. Fig. 5 is a section of a frame showing two lenses embodying my invention mounted therein, said lenses being shown in side elevation. Fig. 6 is a plan view showing a fragment of a plate, such as a vault-cover, containing a plurality of lenses mounted therein.

In said drawings, A designates a metal supporting frame or plate provided with a plurality of openings or sockets within which are adapted to be mounted my improved lenses B. For this purpose the plate is provided with ledges or flanges A', surrounding said openings at the lower sides thereof and upon which the lenses rest when in place therein.

The lens herein shown is cast or molded in one piece, and consists of a top or body portion B' and a relatively long depending leg $B^2$. Said top or body portion B' is herein shown as made of hexagonal shape; but said shape is not essential, as the lens may be made of any form, as seen in plan view, which is found most desirable. Said body portion is provided between its upper and lower surface with a marginal flange $B^3$, which is shown as entirely surrounding the same and which will desirably be of the same shape as the body portion B'. Said flange is adapted to rest upon the ledge A' of the plate and serves to support the lens within the plate, said flange being herein shown as made of considerable thickness to enable it to support any weight which may be brought thereon. Said body portion B' will be made of such width in its part below the flange $B^2$ as to fit loosely between the inner edges of the ledges A' of the frame to provide for the expansion and contraction of said metal plate under varying temperatures. As herein shown, the distance between the lower surfaces of said flange $B^3$ and the upper surface of the lens is such that when in place in the plate A the upper surface of the lens will be exactly flush with the upper surface of the said plate. This will be a desirable construction when the lens is used in sidewalks or like places, but will not be essential when employed in places not designed to serve as a walk, such as vault-walls and the like.

When said lenses are placed in the plate, as shown in Fig. 5 of the drawings, the space between the outer edges and the frame will be filled in with a filling of cement C to prevent accidental displacement of the lens. The intermediate parts of the plate between the lenses will desirably be terminated below the top surface thereof, so as to afford space for a larger body of cement to thereby secure additional strength. The flanges are herein shown and will desirably be made of greater diameter in their lower than in their upper parts, which will increase the horizontal bearing-surface between said cement and flanges and thereby serves as an additional means to prevent vertical movement of the lenses within their seats.

The depending leg $B^2$ has, as seen in side view, the form of a right-angled triangle, the front surface *b* forming the perpendicular of said triangle and the rear surface the hypotenuse thereof. As seen from the front or in face view, the leg is of rectangular form, with parallel vertical side edges or faces and a horizontal lower edge. The base of said leg is of less width from front to rear thereof than the distance between its side edges, and the said front vertical surface $b$ intersects the bottom surface of the body portion of the leg at some distance from the adjacent edge of the said body portion, while the sides and rear surfaces of the leg extend to and practically coincide with the side and rear margins of the said body portion. The front surface $b$ of the leg therefore is a plane surface extending the full width and length of said leg, as shown clearly in Fig. 2 of the drawings, and will desirably be formed nearly in a vertical plane or at right angles to the plane of the upper surface of the body portion, but preferably at a slight inclination from a vertical line, as shown. The rear portion of the leg is composed of three plane triangular oblique surfaces or facets $b'$ $b^2$ $b^3$, each lying in a different plane with respect to the plane of the front surface $b$ of the leg. The middle oblique surface $b'$ extends the full width of the leg at the bottom thereof and the lines forming its outer edges converge upwardly and intersect each other at the base of the leg at a point midway between the side edges thereof. The lateral oblique surfaces $b^2$ and $b^3$ are bounded at their rear edges by said converging lines forming the outer edges of the middle oblique surface and at their outer edges intersect the outer perpendicular side faces $b^4$ of the leg, said side faces being located in vertical planes at right angles to the plane of the front face $b$. The termination of the depending leg short of the extreme front surface of the body portion forms adjacent to said front surface $b$, at the under side of the body portion, a downwardly-facing surface $b^5$, which lies parallel with the upper surface of said body portion.

In a lens constructed as described rays of light passing through the body portion outside of the front vertical face of the leg will pass vertically therethrough and into the inclosed space within. By the provision of the three plane surfaces or facets disposed in different planes with respect to the vertically-arranged front surfaces of the leg the rays of light passing perpendicularly through the lens and striking the said surface will be reflected forward, as shown in Fig. 5, at three different angles, those reflected by the middle facet $b'$ passing straight forward at a slightly-downward inclination, while those reflected from the side facets will converge and cross each other (and also the rays reflected from the middle surface) at a point forward of the leg, the distance of such point from the leg depending upon the angular relation of said side surfaces to the middle surface. By reason of the fact that the central facet extends across the full width of the leg at the extremity of the same a large reflecting-surface will be formed near the extremity of the leg, by which a large portion of the light-rays which pass through the central part of the lens will be thrown forward through the flat front face of the leg into the apartment to be lighted. At the same time the lateral oblique facets will reflect and disperse laterally the rays entering nearer the side margins of the lens. By this arrangement of the oblique reflecting surfaces or facets of the lens, therefore, the dispersive powers thereof will be very large and the rays of light transmitted therethrough will be distributed strongly and uniformly in the space opposite the lens and throughout the space to be illuminated forward of the depending leg, which is entirely outside of the direct range of the rays of light from the lens. The termination of the leg in the rear of the front vertical surface $b$ of the body portion B' affords also means for the direct transmission of vertical rays of light, so that the inclosed space receives light to illuminate the space immediately adjacent to the lens, as well as to illuminate the space outside of the place which the direct rays may enter.

The lenses made as hereinbefore described—namely, with hexagonal body portions and depending legs having flat front faces $b$—will be arranged in the supporting frame or plate, as shown in Fig. 6, in parallel rows, the lenses of each row being arranged with their side faces $b^4$ side by side and parallel with each other and the said flat faces $b$ in alinement with each other. The lenses thus arranged in rows will be so disposed that the lenses of each row will be opposite the spaces between the lenses of adjacent rows, this arrangement bringing the several adjacent side edges of the hexagonal body portions parallel with each other, as seen in Fig. 6, and thereby enabling a maximum area of light-transmitting surface to be obtained, combined with a minimum area of metal between the lenses. The most important advantage of this arrangement, however, is obtained from the location of the vertical flat front surface $b$ of each lens opposite or behind the space between the legs of the lenses in front of it, this construction insuring that light thrown forward from the central part of each lens will pass through the space between the two adjacent lenses in front of it, thereby producing not only a maximum of lighting effect, but uniformity of distribution of the light thrown into the apartment by the lenses.

The lenses will be located at such distances apart with relation to the size and the angles of the reflecting-surfaces that the light reflected and dispersed thereby will be distributed uniformly—that is to say, if the pendent leg be made shorter than herein shown the lenses will be mounted closer together in the plate A, or vice versa.

I claim as my invention—

1. An illuminating-lens comprising a hexagonal body portion and a leg projecting from the inner side thereof, said leg having a front flat face perpendicular or nearly so to the plane of the body portion which extends between two opposite side angles of the body portion with its center at a distance from the intermediate front angle of said body portion, the side surfaces of said leg being parallel with each other and in the same plane with the sides of the body portion while the rear surface of said leg is formed of a plurality of oblique facets which reach to the rear margins of said body portion, said body portion being provided between said front face of the leg and said front angle of the body portion with a flat surface parallel with the outer face of said body portion whereby rays of light may pass perpendicularly through the latter in front of the leg into the inclosed space to be illuminated.

2. An illuminating-lens comprising a body portion and a leg projecting from the inner side thereof, said leg having a flat front face perpendicular or nearly so to the plane of the body portion and, at its rear side, a central and two lateral, triangular facets, the central rear facet being arranged to extend across the leg the full width thereof and to intersect the front, flat face of said leg, at its outer extremity with its side margins converging upwardly and meeting midway between the side faces of the leg and the lateral triangular facets being arranged to intersect the central, triangular facet with its side margins converging toward and meeting at points at the side edges of the leg at the extremity of the same.

3. An illuminating-lens comprising a body portion and a leg projecting from the inner side thereof, said leg having a flat, front face perpendicular or nearly so to the plane of the body portion, two parallel, flat side faces, also perpendicular to the plane of the body portion and at its rear side, a central and two lateral, oblique, triangular facets; the side faces of the leg being of triangular form with their side margins converging to a point at the outer extremity of the leg, the central rear facet being arranged to extend across the leg the full width thereof and to intersect the front flat face of said leg at its outer extremity with its side margins converging upwardly and meeting midway between the side faces of the leg, and the lateral triangular facets extending between and intersecting the flat, triangular side faces of the leg and the said central triangular facet on lines which converge toward and meet at the extremity of the leg at the side edges of the same.

In testimony that I claim the foregoing as my invention I affix my signature, in presence of two witnesses, this 31st day of March, A. D. 1897.

EUGENE J. SULLIVAN.

Witnesses:
C. CLARENCE POOLE,
CHARLES G. MASON.